(12) United States Patent
Takizawa (10) Patent No.: US 9,185,281 B2
(45) Date of Patent: Nov. 10, 2015

(54) CAMERA PLATFORM SYSTEM (75) Inventor: Hiroshi Takizawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 639 days.

(21) Appl. No.: 13/504,145

(22) PCT Filed: Dec. 24, 2010

(86) PCT No.: PCT/JP2010/007506
§ 371 (c)(1),
(2), (4) Date: Apr. 26, 2012

(87) PCT Pub. No.: WO2011/083547
PCT Pub. Date: Jul. 14, 2011

(65) Prior Publication Data
US 2012/0218378 A1 Aug. 30, 2012

(30) Foreign Application Priority Data

Jan. 6, 2010 (JP) ................. 2010-000890

(51) Int. Cl.
*H04N 5/232* (2006.01)
*G03B 17/18* (2006.01)
*G03B 37/02* (2006.01)
*H04N 7/18* (2006.01)
*G03B 17/56* (2006.01)

(52) U.S. Cl.
CPC ............... *H04N 5/232* (2013.01); *G03B 17/18* (2013.01); *G03B 17/561* (2013.01); *G03B 37/02* (2013.01); *H04N 5/23296* (2013.01); *H04N 7/185* (2013.01); *H04N 7/188* (2013.01)

(58) Field of Classification Search
None
See application file for complete search history.

(56) References Cited

U.S. PATENT DOCUMENTS

| 6,392,693 | B1 * | 5/2002 | Wakiyama et al. | 348/143 |
| 6,977,678 | B1 | 12/2005 | Wada et al. | |
| 8,257,133 | B2 * | 9/2012 | Ando et al. | 446/175 |
| 8,274,561 | B2 | 9/2012 | Jodan et al. | |

(Continued)

FOREIGN PATENT DOCUMENTS

| CN | 1249609 A | 4/2000 |
| CN | 101123690 A | 2/2008 |

(Continued)

OTHER PUBLICATIONS

Apr. 5, 2011 International Search Report and Written Opinion in International Patent Appln. No. PCT/JP2010/007506.

(Continued)

*Primary Examiner* — Andy Rao
*Assistant Examiner* — Zaihan Jiang
(74) *Attorney, Agent, or Firm* — Fitzpatrick, Cella, Harper & Scinto (57) ABSTRACT

A camera platform system 1 has a camera 11 that takes an image of an object to generate a shot image, camera platforms 12 and 13 that rotate the camera around a pan axis and a tilt axis, and image processors 4, 5, and 6 that generate a display image based on the shot image. When the camera passes a predetermined angle position to rotate around the tilt axis, the image processor generates a first display image corresponding to an image formed by rotating the shot image by an angle larger than 0 degree and smaller than 180 degrees around the pan axis at the predetermined angle position before generating a second display image corresponding to an image formed by rotating the shot image by 180 degrees around the pan axis.

9 Claims, 6 Drawing Sheets

(56) References Cited

U.S. PATENT DOCUMENTS

| | | | |
|---|---|---|---|
| 8,279,283 B2 | 10/2012 | McCormack | |
| 8,624,976 B2 * | 1/2014 | Nystrom | 348/143 |
| 2002/0105513 A1 * | 8/2002 | Chen | 345/419 |
| 2007/0115358 A1 | 5/2007 | McCormack | |
| 2008/0158355 A1 | 7/2008 | Jodan et al. | |

FOREIGN PATENT DOCUMENTS

| | | | |
|---|---|---|---|
| CN | 101313343 A | 11/2008 | |
| JP | 10-271364 A | 10/1998 | |
| JP | 2003-289466 A | 10/2003 | |
| JP | 2004-056239 A | 2/2004 | |
| JP | 4063604 B2 | 3/2008 | |

OTHER PUBLICATIONS

Aug. 4, 2014 Chinese Official Action in Chinese Patent Appln. No. 201080060405.4.

May 8, 2013 Russian Official Action in Russian Patent Appln. No. 2012128444.

* cited by examiner

CAMERA PLATFORM SYSTEM

TECHNICAL FIELD

The present invention relates to a camera platform system capable of performing a pan rotation and a tilt rotation of a camera.

BACKGROUND ART

In a camera platform system of a ceiling hanging type such as a surveillance camera, when shooting an object approaching from a front side with tracing it using a tilt-rotating camera, the object in an image obtained after passing a position immediately under the camera is turned upside down if any image processing is performed. Therefore, when the tilt angle of the camera becomes a predetermined set angle (for example, 90 degrees by which the camera faces a directly-downward direction), a function that performs a reverse processing by 180 degrees of the shot image to correctly display top and bottom of the object is provided in many cases.

Japanese Patent Laid-Open No. 2003-289466 discloses a method of generating a display image for which a reversing processing is performed so as to have a normal top-and-bottom relationship by changing a reading method of the shot image from the memory which is provided to tentatively store the shot image when a tilt angle of the camera with respect to the ceiling is equal to or larger than 90 degrees.

However, in the method disclosed in Japanese Patent Laid-Open No. 2003-289466, in spite of the fact that a tilt rotation direction of the camera does not change, since a traveling direction of the object in the display image suddenly changes by the reverse processing, a user who observes the object gets nervous and has a sense of incompatibility in the operation.

Moreover, when the object goes or comes at a position immediately under the camera, the traveling direction of the object cannot be determined, and the confusion may occur in the operation to trace the object.

SUMMARY OF INVENTION

The present invention provides a camera platform system that decreases unnaturalness of the change in a traveling direction of an object in a display image to prevent the confusion of the operation to trace the object.

A camera platform system as one aspect of the present invention includes a camera configured to take an image of an object to generate a shot image, a camera platform configured to rotate the camera around a pan axis and a tilt axis, and an image processor configured to generate a display image based on the shot image. When the camera passes a predetermined angle position to rotate around the tilt axis, the image processor generates a first display image corresponding to an image formed by rotating the shot image by an angle larger than 0 degree and smaller than 180 degrees at the predetermined angle position before generating a second display image corresponding to an image formed by rotating the shot image by 180 degrees.

A camera platform system as another aspect of the present invention includes an imaging lens configured to take an image of an object, and a camera platform including a first drive mechanism configured to rotate the imaging lens around a first axis perpendicular to a vertical direction to change a tilt angle of an optical axis of the imaging lens and the vertical direction and a second drive mechanism configured to rotate the imaging lens and the first drive mechanism around a second axis perpendicular to the first axis. The system includes an image processor configured to generate a first display image corresponding to an image formed by rotating a shot image obtained before the tilt angle reaches a first angle by an angle larger than 0 degree and smaller than 180 degrees in accordance with the tilt angle reaching the first angle, and to generate a second display image corresponding to an image formed by rotating the shot image obtained before the tilt angle reaches the first angle by 180 degrees in accordance with the tilt angle reaching a second angle different from the first angle when the tilt angle is changed.

Further features and aspects of the present invention will become apparent from the following description of exemplary embodiments with reference to the attached drawings.

DESCRIPTION OF EMBODIMENTS

Exemplary embodiments of the present invention will be described below with reference to the accompanied drawings.

Embodiment 1

Figure 1:
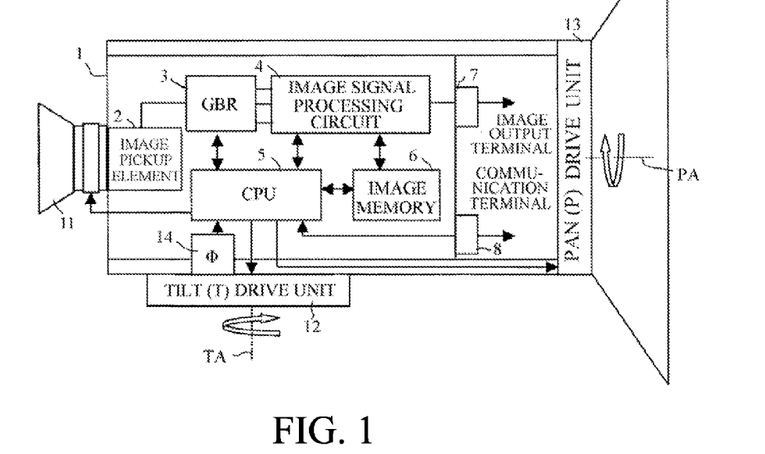
FIG. 1 is a diagram illustrating a schematic configuration of a camera platform system that is Embodiment 1 of the present invention.

FIG. 1 illustrates a configuration of a camera platform system that is Embodiment 1 of the present invention. FIGS. 2A to 2D illustrate the relation between the camera platform system and a monitor display image depending upon its tilt angle in Embodiment 1.

In FIG. 1, reference numeral 1 denotes a camera platform system configured by a camera which takes an image of an object to generate a shot image and a camera platform by which the camera is capable of performing a pan rotation around a pan axis and a tilt rotation around a tilt axis. Reference character PA denotes a pan axis (a second axis), and reference numeral TA denotes a tilt axis (a first axis). The tilt axis TA is an axis that is perpendicular to a vertical direction, and capable of changing a tilt angle of an optical axis of an imaging lens 11 and the tilt angle by the tilt rotation. The pan axis PA is an axis that is perpendicular to the tilt axis TA. In the embodiment, the term of "pan rotation" means a rotational movement of a camera to move a shot image in a lateral direction, and the term of "tilt rotation" means a rotational movement of the camera to move the shot image in an upward and downward direction. The terms of "lateral direction" and "upward and downward direction" mean directions in displaying an image.

The pan rotation and the tilt rotation of camera platform system 1 are controlled by a remote controller that is not shown or by a remote operation through a network such as a LAN.

Light from the object passes the imaging lens 11 to form an object image on an image pickup element 2 such as a CCD sensor or a CMOS sensor. The image pickup element 2 performs a photoelectric conversion of the object image to output an imaging signal. A GBR separation circuit 3 separates the imaging signal from the image pickup element 2 into color signals of G (green), B (blue), and R (red). An image signal processing circuit 4 converts the color signals of G, B, and R (analog signals) into digital signals before performing various kinds of signal processings to the digital signals to generate image signals (hereinafter, referred to as shot images). At least one frame image that constitutes the shot images is temporarily written in an image memory 6. An arithmetic processing circuit 5 (hereinafter, referred to as a CPU) performs an address generation control or a timing control of the image memory 6.

The CPU 5 performs writing and reading controls of the frame image for the image memory 6. The image signal processing circuit 4 converts the frame image read from the image memory 6 into a predetermined output form before outputting it from an image output terminal 7 to a monitor that is not shown. An image processor is constituted by the image signal processing circuit 4, the CPU 5, and the image memory 6.

Thus, the frame images are sequentially outputted to the monitor to display the output image. The output image is an image obtained as a result of the reading control described below for the shot image that is in a state where the camera has taken an image (the frame image written in the image memory 6), and may be the same as the shot image or may be a different image.

The CPU 5 performs controls of a tilt (T) drive unit (a first drive mechanism) 12 and a pan (P) drive unit 13 (a second drive mechanism), or a control of a zoom (Z) and focus (F) of the imaging lens 11. Specifically, the CPU 5 receives the P/T/Z/F control data sent by a remote controller that is not shown or the like through a communication terminal 8. Then, the CPU 5 outputs the P/T control signal to a P drive unit 13 and a T drive unit 12 in accordance with the control data, and outputs the Z/F control signal to the imaging lens 11. The P drive unit 13 and the T drive part 12 perform the pan rotation and the tilt rotation of the camera platform in accordance with the P/T control signal. The imaging lens 11 performs the zoom and focus operations in accordance with the Z/F control signal.

Reference numeral 14 denotes a tilt angle detector, which detects a tilt angle with respect to an installation standard of the camera platform (a ceiling surface in the embodiment) to output the angle data corresponding to the tilt angle to the CPU 5.

Figure 3A:
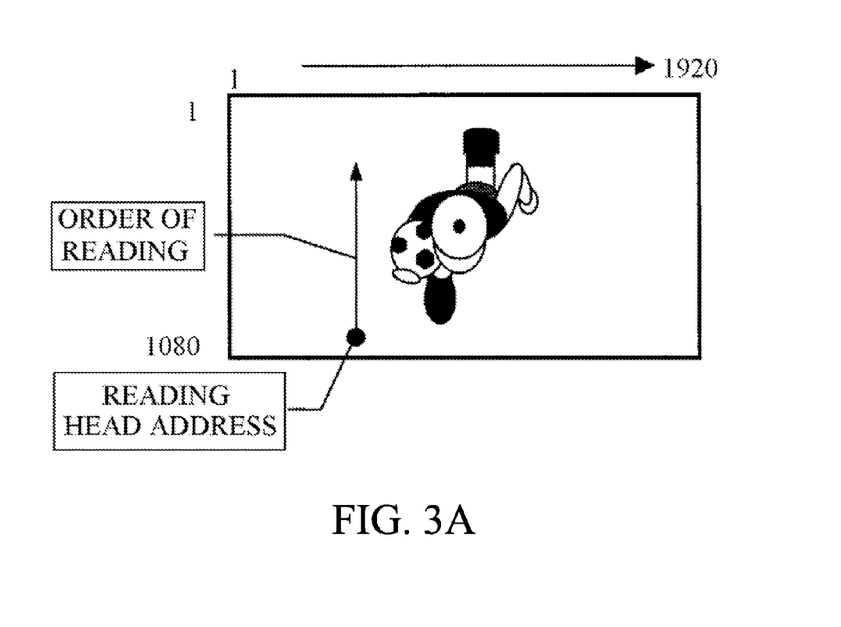
FIGS. 3A and 3B are diagrams of describing a control operation of an image memory in Embodiment 1.

A control of the image memory 6 will be described in detail. As illustrated in FIG. 3A, the number of effective pixels of the shot image (the frame image) is assumed to be 1920 in a horizontal direction and 1080 in a vertical direction, and pixel data of G, B, and R is assumed to be 10 bit respectively. The sampling is performed at a cycle in which the data of the number of frames needed per second is obtained from the top of the left on the screen, and GBR pixel data equal to or more than one frame is written in the image memory 6 corresponding to the writing address (simply, 1920×1080× the number of the frames) that is generated relating to the number of pixels. The width of data is 30 bit. The configuration can be changed in accordance with the restriction of the hardware such as the number of effective pixels, a generated address, a data width, and the number of CPUs.

Figure 2A:
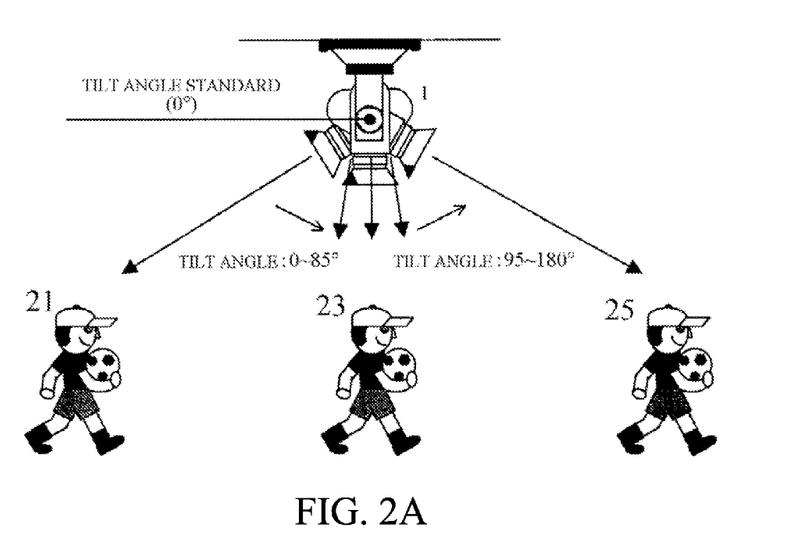
FIGS. 2A to 2D are diagrams illustrating the relationship of an object, a camera platform system, and a monitor display in Embodiment 1.

Next, the control of the image memory 6 corresponding to the rotation of the camera platform system 1 will be described. As illustrated in FIG. 2A, the camera platform system 1 has a base portion of the P drive unit 13 that is attached to the ceiling to be hung from the ceiling. In the embodiment, a case where the camera platform system 1 traces moving objects 21, 23, and 25 to perform the tilt rotation and the tilt angle (the tilt angle) is changed from 0 degree to 180 degrees while passing a location immediately under the camera platform system 1 on the way will be described.

When the tilt angle is between 0 degree and 85 degrees as a first set angle (a first angle), the reading from the image memory 6 is performed in order of the writing, i.e. a sequential reading is performed. Thus, the output image 26 of the object is displayed on the monitor. Hereinafter, a (nonrotating) output image that is the same as the shot image like the output image 26 is referred to as a nonrotating image.

Figure 2B:
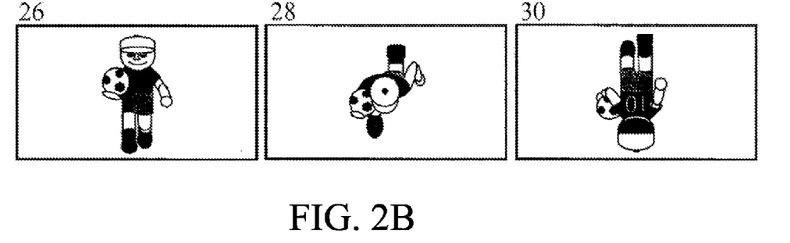

When the tilt angle is between 95 degrees that is a second set angle (a second angle) and 180 degrees, the object is displayed upside down like an image 30 in the sequential reading from the image memory 6. Therefore, specifically, the reading is performed in a direction from a written 1920th pixel of a 1080th line to a first pixel of a first line from, which is opposite to the writing order. As a result, an output image (a second display image) 35 which corresponds to an image formed by rotating the shot image (the image 30) by 180 degrees around the pan axis, i.e. an image whose top and bottom are reversed is obtained. Hereinafter, the output image that corresponds to the image rotated by 180 degrees with respect to the shot image like the output image 35 is referred to as a 180-degree rotating image.

Figure 2C:
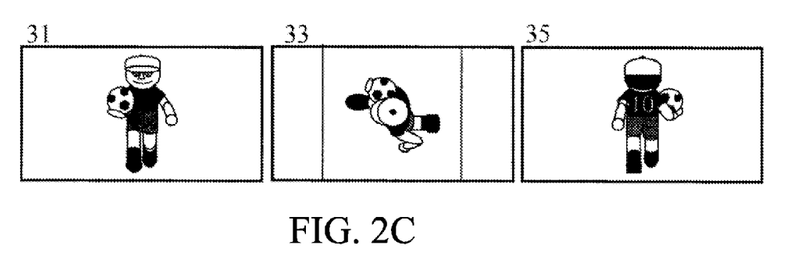

In a range of 85 degrees to 95 degrees (a predetermined angle position) of the tilt angle that is the vicinity immediately under the camera platform system 1, the reading from the image memory 6 is performed so as to obtain the output image (the first display image) 33 which corresponds to the image formed by rotating a shot image (an image 28) around the pan axis by 90 degrees.

Figure 3B:
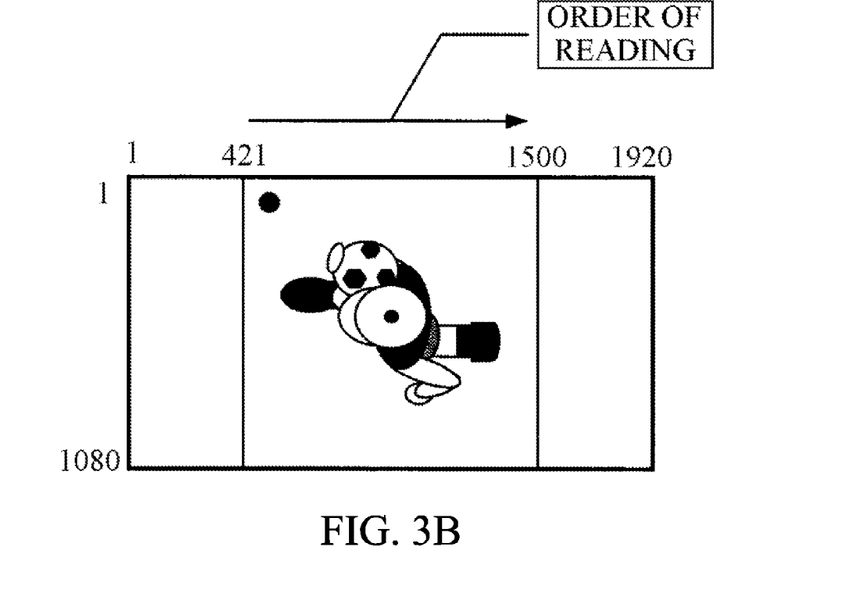

Specifically, as illustrated in FIG. 3B, heading 421-pixel data of the 1080th line written in the image memory 6, subsequently 421-pixel data of the 1079th line is read, and finally 1500-pixel data of the first line is read. Hereinafter, the output image that corresponds to the image that is rotated by 90 degrees with respect to the shot image like the output image 33 is referred to as a 90-degree rotating image.

In the image signal processing circuit 4, the display positions of the 1st to 420th pixels and 1501st to 1920th pixels where pixel data do not exist in the 1st to 1080th lines are set to fixed data such as a black level. Then, valid data read from the image memory 6 are output in a suitable output form such as HD-SDI to output it to the monitor.

Figure 4:
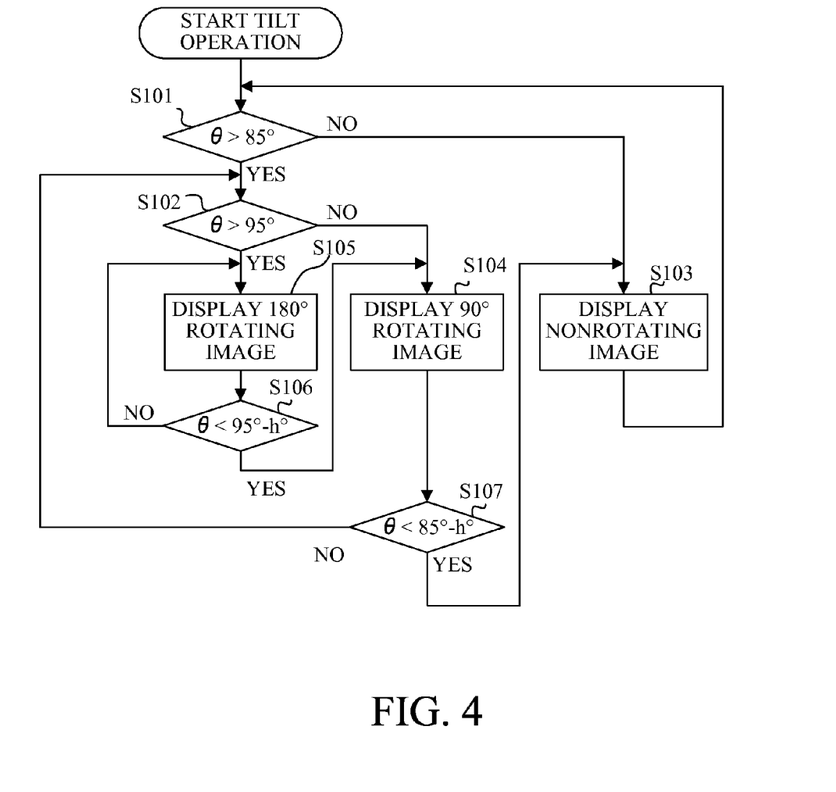
FIG. 4 is a flowchart of describing the transition of a screen display in Embodiment 1.

A flowchart of FIG. 4 illustrates an image display processing (reading control from the image memory 6) in accordance with a detection angle θ by a tilt angle detector 14 performed by the CPU 5. The angle detection by the tilt angle detector 14 and the image display processing in accordance with the detection angle θ are performed in each frame.

When the processing starts, the CPU 5 determines whether the detection angle θ by the tilt angle detector 14 is equal to or larger than 85 degrees that is the first set angle in Step S101. It proceeds to Step S102 when the detection angle θ is equal to or larger than 85 degrees, i.e., in accordance with the arrival of the detection angle θ to 85 degrees, and on the other hand it proceeds to Step S103 when it is smaller than 85 degrees.

In Step S102, the CPU 5 determines whether the detection angle θ by the tilt angle detector 14 is equal to or larger than 95 degrees that is the second set angle. It proceeds to Step S105 when the detection angle θ is equal to or larger than 95 degrees, i.e., in accordance with the arrival of the detection angle θ to 95 degrees, and on the other hand it proceeds to Step S104 when it is smaller than 95 degrees.

In Step S103, the CPU 5 displays a nonrotating image on the monitor. In Step S104, the CPU 5 displays a 90-degree rotating image on the monitor. In Step S105, the CPU 5 displays 180-degree rotating image on the monitor.

Though the output image displayed on the monitor is switched by the processes of Steps S103 to S105, in order to switch the image, a hysteresis angle of h-degree is set to the first set angle and the second set angle. The hysteresis angle of h-degree is an angle set so as to smoothly switch the display image, which is set to an angle smaller than a different between the first set angle and the second set angle.

When the detection angle θ changes into the direction from 180 degrees to 0 degree, "The first set angle—h-degree" and "The second set angle—h-degree" become angles at which the image switch is performed.

In the embodiment, a case where the 90-degree rotating image is displayed between the nonrotating image and the 180-degree rotating image is described. However, the output image corresponding to the image which is formed by rotating the shot image around the pan axis by an angle in a range from 0 degree to 180 degrees other than 90 degrees before and after the 90-degree rotating image may also be displayed between the nonrotating image and the 180-degree rotating image. As a result, the image can be switched with few senses of incompatibility.

Figure 2D:
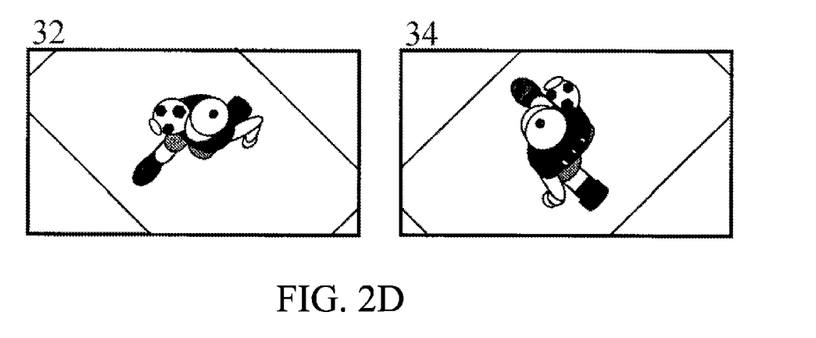

Specifically, as illustrated in FIG. 2D, a 45-degree rotating image 32 corresponding to the image that is formed by rotating the shot image around the pan axis by 45 degrees is displayed between the nonrotating image 31 and the 90 degrees rotating image 33 of FIG. 2C in accordance with a case where the detection angle θ by the tilt angle detector 14 is 85 degrees. Moreover, a 135-degree rotating image 34 corresponding to the image that is formed by rotating the shot image around the pan axis by 135 degrees is displayed between the 90-degree rotating image 33 and a 180-degree rotating image 35 in accordance with a case where the detection angle θ is 95 degrees.

Figure 5:
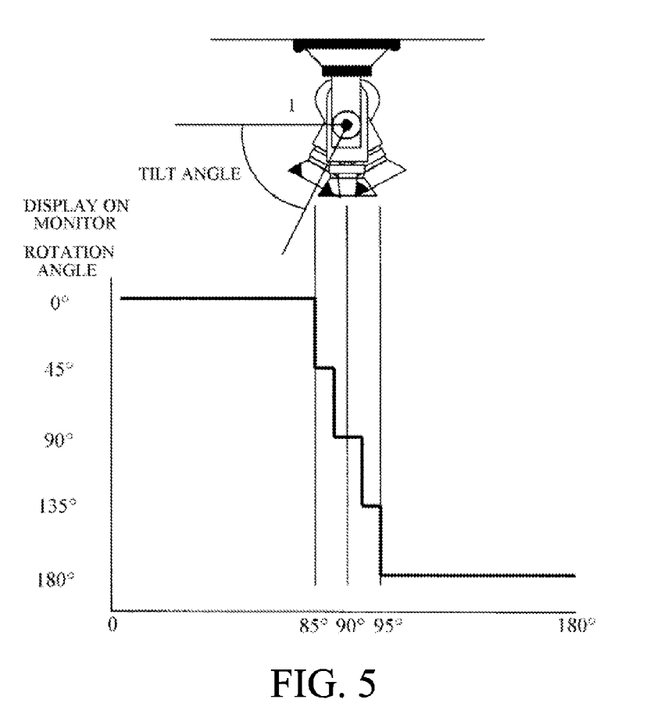
FIG. 5 is a diagram of describing the relationship of a camera platform system and a monitor display rotation angle in Embodiment 1.

FIG. 5 illustrates the relation of the tilt angle (the detection angle θ) of the camera platform system 1 in this case and the rotation angle for the shot image outputted on the monitor in this case. In FIG. 5, the hysteresis angle h-degree is omitted.

Conventionally, the nonrotating image is suddenly switched to the 180-degree rotating image when passing a position immediately under the camera platform system 1. However, in the embodiment, the output image in which the rotation angle around the pan axis gradually increases in the vicinity immediately under the camera platform system 1 before displaying the 180-degree rotating image.

When the direction of the change of the tilt angle is in a direction from 180 degrees to 0 degree, the output image in which the rotation angle around the pan axis is gradually reduced in the vicinity immediately under the camera platform system 1 from the 180-degree rotating image is displayed before displaying the nonrotating image.

The 45-degree rotating image 32 and the 135-degree rotating image 34 illustrated in FIG. 2D cannot be achieved only by the change of the reading address from the simple image memory 6 described above. However, the 45-degree rotating image 32 and the 135-degree rotating image 34 can be generated by calculating the pixel data at the display pixel position based on an adjacent pixel data value obtained when rotating from data written in the image memory and the distance of pixels to interpolate it.

Figure 6:
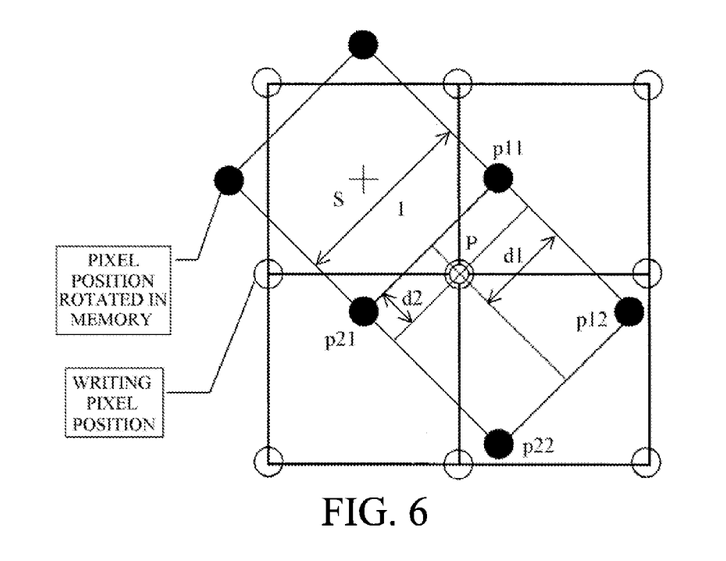
FIG. 6 is a diagram of describing a method of interpolating a pixel in Embodiment 1.

For example, as illustrated in FIG. 6, the image data written in image memory 6 is rotated on the image memory 6 and data of a pixel P which is required at the time of the output from the camera platform system 1 is interpolated to obtain the rotating image around the pan axis centered around a pixel s. When the data values of four pixels adjacent to the pixel P after the rotation are assumed to be p11, p12, p21, and p22, the pixel data of the pixel P can be obtained by loading these values from the image memory 6 into the CPU 5 and performing the calculation using the following expression by a linear interpolation. The distance of pixels is assumed to be 1 (one positive pixel).

$$P = p11(1-d1)(1-d2) + p12(1-d1)d2 + p21 \cdot d1(1-d2) + p22 \cdot d1 \cdot d2$$

In the expression, d1 and d2 are distances from the pixel P to the four rotated pixels in two directions orthogonal to each other.

In the embodiment, a non-interlace method is described, but a basic idea of an interlace method is similar to that of the non-interlace method except that a frame processing is inserted.

In the method of the pixel interpolation, it is not limited to the method of the four-adjacent pixel interpolation method described as an example, but the interpolation of higher-order by multiple pixels or the data of a front frame may also be used.

Moreover, in order to shorten a calculation processing time, a parallel processing using a plurality of image memories may be performed.

In addition, each angle (45 degrees, 90 degrees, 135 degrees, 180 degrees, 85 degrees, and 95 degrees) and other numerical values in the embodiment described above are merely examples, and other angles or numerical values may also be set.

In the embodiment, the case in which the shot image is rotated around the pan axis is described, but the pan axis does not have to be an exact pan axis and the shot image may also be rotated around an axis tilted in a range of 0 to 50 degrees with reference to the exact pan axis, corresponding to the range of 85 to 95 degrees of the tilt angle described above. As a central axis that rotates the shot image, the image may be rotated around any axis if the image is rotated without a sense of incompatibility. However, it is preferable that the rotational central axis is an axis that passes one point in the shot image and that is positioned between an image center and an area where a moving object appears (more preferably, between the image center and a position of the center of gravity of the moving object, or at the position of the center of gravity of the moving object). With regard to the rotational center, the same is applied to the embodiments described below.

Embodiment 2

Figure 7A:
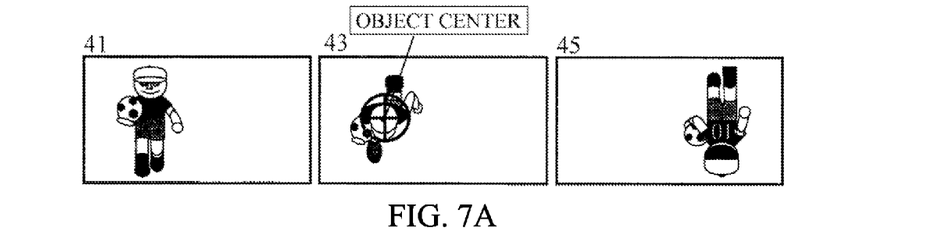
FIGS. 7A and 7B are diagrams of illustrating a monitor display of an object in Embodiment 2.

Embodiment 1 describes the case in which the rotation center of the image around the pan axis is assumed to be a center of the image, but as the output images 41, 43, and 45 illustrated in FIG. 7A, a case in which a moving object does not exist at the image center is also considered.

Figure 7B:
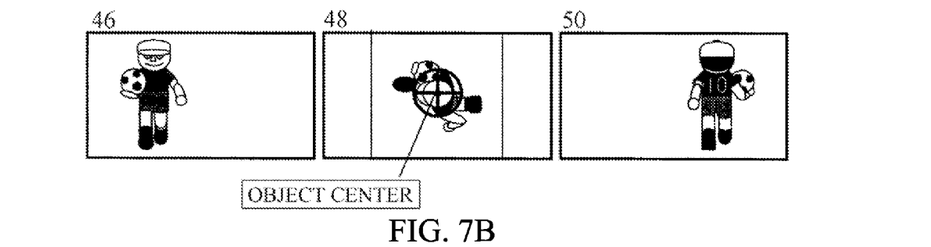

In this case, a detecting function that detects an area where an object moving in the shot image exists (preferably, a center position of the area) is given to the CPU 5 to be able to obtain the rotating image centered around the area where the object exists as illustrated in FIG. 7B.

The function to detect the area where the moving object exists can be achieved as follows for example. An amount of movement of the object is calculated based on the difference between the image data of a current frame and a previous frame by the CPU 5. Then, the amount of the movement is compared with an amount of the tilt angle change obtained by the output of the tilt angle detector 14 loaded into the CPU 5 and an area where the amount of the movement is small is determined as the traced moving object to be able to obtain the area of the moving object (furthermore, the center of the area).

Similarly to Embodiment 1, a 90-degree rotating image 48 (furthermore, 45-degree and 135-degree rotating images) is displayed in the vicinity immediately under the camera platform system centered around the area of the moving object obtained above. In other words, a nonrotating image 46, the 90-degree rotating image 48, and the 180-degree rotating image 50 are sequentially displayed on the monitor. As a result, the display with the sense of incompatibility that the output image is suddenly switched from the nonrotating image 46 to the 180-degree rotating image 50 and that the person in the image moves right and left suddenly can be prevented.

Embodiment 3

Embodiments 1 and 2 described the case in which each rotating image was generated only by the reading control (the image processing) from the image memory 6. However, a more beneficial effect can be achieved by adding the movement of the imaging lens 11.

For example, in Embodiment 1, the imaging lens 11 performs an optical zoom operation from the previous zoom state to a zoom state at a wide-angle side by the instruction from the CPU 5. Thus, since the object comes close to the image center on the monitor, an effect similar to that of the method of the rotating image generation centered around the object area described in Embodiment 2 can be expected. Moreover, since surrounding scenery is also displayed by performing the optical zoom operation at the wide-angle side, performing the rotation processing around the pan axis becomes clearer.

Figure 8A:
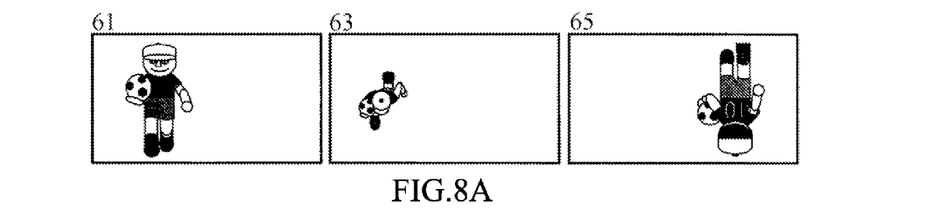
FIGS. 8A to 8C are diagrams of illustrating a monitor display of an object in Embodiment 3.

FIG. 8A illustrates output images 61, 62, and 63 displayed on the monitor when the imaging lens 11 performs only the optical zoom operation (hereinafter, referred to as a lens zoom) to the wide-angle side in the vicinity immediately under the camera platform system 1.

When the lens zoom is performed to the wide-angle side in the vicinity immediately under the camera platform system 1, as illustrated in the output image 63, an image with a wide range of the peripheral of the object is displayed though the object in the image becomes small.

Figure 8B:
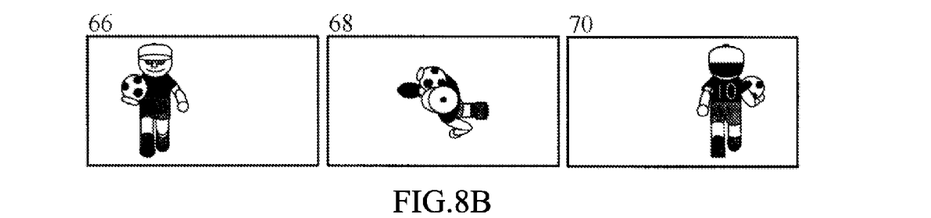

In Embodiments 1 and 2, a fixed data such as black was displayed in the peripheral range without the image data when the 90-degree rotating image was displayed. However, as illustrated in FIG. 8B, a 90-degree rotating image 68 where the image exists also in the peripheral range can be displayed by expanding the object (a part of the 90-degree rotating image) in accordance with the size of the object in the nonrotating image 66 or the 180-degree rotating image 70 by the electronic zoom operation.

In the electronic zoom operation, the distance between pixels is calculated by the CPU 5 in accordance with the expansion rate as similarly to the pixel data interpolation described in Embodiment 1, and the data of a position required to perform a cut-out display centered around the object is generated based on the adjacent pixel data. The 90-degree rotating image 68 illustrated in FIG. 8B is an image that is generated by the expansion processing by the electronic zoom operation after a part centered around the object of the output image 63 in FIG. 8A is cut out to rotate it by 90 degrees around the pan axis.

Figure 8C:
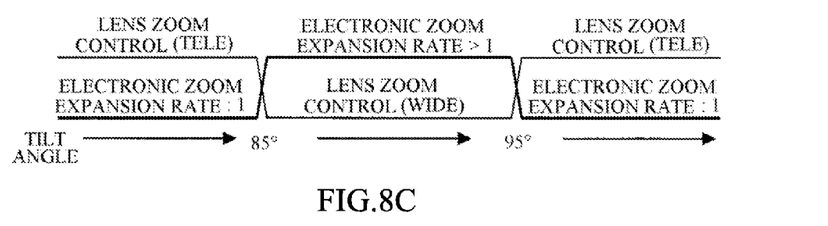

FIG. 8C illustrates the relation of the tilt angle, the expansion rate of the electronic zoom, and the lens zoom state in the camera platform system. The relation between the lens zoom state and the angle of field may be tabled to be stored in the CPU 5 or may control the zoom magnification so as to obtain the object image of almost the same size by storing the size of the object immediately before the lens zoom operation in the memory.

In addition, in order to perform the image switch with a smaller sense of incompatibility, the moving velocity of the object may be detected to change the tilt angle for displaying the rotating image or the number of the rotating images that are displayed between the nonrotating image and the 180-degree rotating image in accordance with the moving velocity. If the moving velocity of the object is fast (If it is a second speed that is faster than a first speed), the sense of incompatibility is not easily generated even when the rotating image is displayed from a shallow tilt angle (for example, a tilt angle that is smaller than 85 degrees) or the number of rotating images is reduced. Moreover, if the moving velocity of the object is slow (If it is the first speed), the sense of incompatibility is not easily generated as the number of rotating images in the vicinity immediately under the camera platform system increases.

The detecting function of the moving velocity of the object can be achieved by the CPU 5 which calculates the moving velocity based on an amount of the change per unit time of the output of the tilt angle detector 14.

Moreover, the camera platform system 1 has an operation function of the pan rotation in accordance with the pan instruction signal inputted by the remote control, but the pan instruction signal inputted during the display processing of the rotating image in the vicinity immediately under the camera platform system 1 may also be disregarded. In other words, the pan rotation may not be performed even if the pan instruction signal is inputted. As a result, the delay of the generation processing of the rotating image or the growth of the circuit size for the processing can be prevented.

Moreover, in each of the above embodiments, though the case in which the rotating image is generated by using the CPU 5, the image memory 6, and the image signal processing circuit 4 built into the camera platform is described, these may be provided outside the camera platform to generate the rotating image. Also in this case, the camera platform system is configured including the CPU, the image memory, and the image signal processing circuit provided outside the camera platform.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-000890, filed on Jan. 6, 2010, which is hereby incorporated by reference herein in its entirety.

INDUSTRIAL APPLICABILITY

The camera platform system that decreases unnaturalness of the change in a traveling direction of the object in the display image can be provided.

The invention claimed is:

1. A camera platform system comprising:
   a camera configured to take an image of an object to generate a shot image;
   a camera platform configured to rotate the camera around a pan axis and a tilt axis; and
   an image processor configured to generate a display image based on the shot image,
   wherein when the camera rotates around the tilt axis to pass a predetermined angle position of the camera without rotating around the pan axis, the image processor generates a first display image corresponding to an image formed by rotating the shot image by an angle larger than 0 degrees and smaller than 180 degrees at the predetermined angle position of the camera before generating a second display image corresponding to an image formed by rotating the shot image by 180 degrees, and
   wherein before the camera rotates around the tilt axis to pass the predetermined angle position of the camera, the image processor generates a display image corresponding to an image formed using the shot image without rotation.

2. The camera platform system according to claim 1, wherein the image processor has a detecting function that detects a moving object in the shot image, and generates the first and second display images corresponding to an image formed by rotating the shot image that passes a position at which the moving object is detected when the moving object is detected.

3. The camera platform system according to claim 1, wherein the image processor performs an optical zoom operation or an electronic zoom operation that expands a part of the shot image to a wide-angle side of the camera to generate the first display image at the predetermined angle position.

4. The camera platform system according to claim 1, wherein the image processor has a detecting function that detects a moving velocity of a moving object in the shot image, and is configured to increase the number of images that are generated as the first display image when the moving velocity is a second velocity that is higher than a first velocity.

5. The camera platform system according to claim 1, wherein the camera platform has an operation function that rotates around the pan axis in accordance with a pan instruction signal inputted to the camera platform, and
   wherein when the first display image is displayed, the camera platform does not rotate around the pan axis even if the pan instruction signal is inputted.

6. The camera platform system according to claim 1, wherein both the pan axis and the tilt axis are perpendicular to an optical axis of an optical system provided with the camera.

7. A camera platform system comprising:
   an imaging lens configured to take an image of an object;
   a camera platform including (a) a first drive mechanism configured to rotate the imaging lens around a first axis perpendicular to a vertical direction to change a tilt angle of an optical axis of the imaging lens and the vertical direction and (b) a second drive mechanism configured to rotate the imaging lens and the first drive mechanism around a second axis perpendicular to the first axis; and
   an image processor configured to generate a first display image corresponding to an image formed by rotating a shot image obtained before the tilt angle of the optical axis of the imaging lens reaches a first angle by an angle larger than 0 degrees and smaller than 180 degrees in accordance with the tilt angle of the optical axis of the imaging lens reaching the first angle, the first angle being different from 0 degrees, and to generate a second display image corresponding to an image formed by rotating the shot image obtained before the tilt angle of the optical axis of the imaging lens reaches the first angle by 180 degrees in accordance with the tilt angle of the optical axis of the imaging lens reaching a second angle different from the first angle when the tilt angle of the optical axis of the imaging lens is changed without rotation of the imaging lens around the second axis,
   wherein before the tilt angle of the optical axis of the imaging lens reaches the first angle, the image processor generates a display image corresponding to an image formed using the shot image without rotation.

8. The camera platform system according to claim 7, wherein both the first axis and the second axis are perpendicular an optical axis of an optical system provided with the camera.

9. The camera platform system according to claim 1, wherein the image processor generates the first display image before the camera passes an angle in which the camera faces a directly downward direction around the tilt axis.

* * * * *